US00RE37443B1

(19) United States
(12) Reissued Patent
Yaguchi

(10) Patent Number: US RE37,443 E
(45) Date of Reissued Patent: Nov. 13, 2001

(54) ELECTRIC POWERED BICYCLE

(75) Inventor: Osamu Yaguchi, Kashiwazaki (JP)

(73) Assignee: Kabushiki Kaisha Riken, Tokyo (JP)

(21) Appl. No.: 09/252,587

(22) Filed: Feb. 18, 1999

Related U.S. Patent Documents

Reissue of:
(64) Patent No.: 5,603,388
Issued: Feb. 18, 1997
Appl. No.: 08/532,529
Filed: Sep. 22, 1995

U.S. Applications:

(63) Continuation of application No. 08/304,706, filed on Sep. 12, 1994, now abandoned.

(30) Foreign Application Priority Data

Sep. 14, 1993 (JP) ..... 5-252535
Dec. 29, 1993 (JP) ..... 5-353791

(51) Int. Cl.[7] ..... B62M 7/00
(52) U.S. Cl. ..... 180/206; 180/220; 180/65.2
(58) Field of Search ..... 180/205, 206, 180/207, 220, 65.1, 65.2; 280/288.4

(56) References Cited

U.S. PATENT DOCUMENTS 3,921,741 * 11/1975 Garfinkle et al. ..... 180/205
4,221,275 * 9/1980 Pennebaker et al. ..... 180/206
4,364,448 * 12/1982 Ikuma ..... 180/206
4,541,500 * 9/1985 Gelhard ..... 180/205

FOREIGN PATENT DOCUMENTS

197804 * 4/1978 (CH) ..... 180/220
598051 * 4/1978 (CH) ..... 180/220
517224 * 12/1992 (EP) ..... 180/222
2413254 * 8/1979 (FR) ..... 180/220
63-263189 * 10/1988 (JP) ..... 180/220

* cited by examiner

*Primary Examiner*—Kevin Hurley
(74) *Attorney, Agent, or Firm*—Hopgood, Calimafde, Judlowe & Mondolino, LLP

(57) ABSTRACT

An electric powered bicycle having a dip sensor or switch and/or a gradient sensor or switch. The bicycle has front and rear wheels each rotatably supported by a frame; a chain slung between the wheels and a chainset for transferring manual power to the wheels; an electric motor coupled to one of the wheels for driving the wheel directly; and a power supply capable of supplying electric power to the motor. The dip gradient sensors are associated with a pulse width modulation circuit.

10 Claims, 9 Drawing Sheets

ELECTRIC POWERED BICYCLE

Matter enclosed in heavy brackets [ ] appears in the original patent but forms no part of this reissue specification; matter printed in italics indicates the additions made by reissue.

This application is *a reissue of Ser. No. 08/532,529 filed Sep. 22, 1995 now U.S. Pat. No. 5,603,388 which is* a continuation of application Ser. No. 08/304,706 filed Sep. 12, 1994, and now abandoned.

BACKGROUND OF THE INVENTION

1. Field of the Invention

This invention relates to an electric powered bicycle having a DC motor for use as an auxiliary power source, a dip sensor or switch for detecting a dip of a chain and/or a gradient sensor or switch.

2. Description of the Prior Art

An auxiliary power unit or bicycle having a DC motor for use as an auxiliary power source is applied by the present inventor in accordance with Japanese Patent Application No. 62-97083, laid open for public inspection as JP-A-63-263189.

In FIG. 1, a DC motor-control circuit for use in a bicycle (FIG. 2) comprises a DC motor 1 having its output shaft meshed with a chainset of the bicycle. A power supply voltage from a battery 2 can be supplied to the DC motor 1 through an emitter-collector of a power transistor 3. A collector and a base of the power transistor 3 are connected to a base and a collector of a detection transistor 6 through resistors 4 and 5, respectively. An emitter of the detection transistor 6 is grounded through a switch 7.

Therefore, even if the switch 7 is turned on, transistors 6 and 3 maintain an OFF state unless the DC motor 1 is not rotating. When an external force causes the rotation of a rotor of the DC motor 1, induced voltage pulses generated between brushes of the DC motor 1 exceeding a predetermined level are applied to the base-emitter of the detection transistor 6. Then the transistors 6 and 3 are sequentially turned on to transfer their latch conditions.

An output of a pulse generator 8 which generates periodical pulses is ORed to the base of the detection transistor 6 through a transistor 9. The power supply for the pulse generator 8 is controlled by another transistor 11, and is maintained by a smoothing capacitor 12 upon instantly turning the transistor 11 off. The pulse generator 8 produces output pulses each instantly turning off the detection transistor 6 to turn off the power transistor 3. The detection transistor 6 detects the collector voltage of the power transistor 3 still in an OFF state just after the output pulse returns to the normal level. When the DC motor 1 is rotating, it generates an induced voltage or potential to again turn on the detection transistor 6, which turns on the power transistor 3 so as to maintain the rotation of the DC motor 1 by supplying power thereto.

The DC motor 1 or M is mounted on a frame 21 of the bicycle as shown in FIG. 2. In this case, an output shaft of the DC motor M is rotatably coupled to the chainset or front sprocket 23 through a gearbox G. Therefore, as a younger or aged driver continues pedalling on a pedal 24, the bicycle is moving and the shaft of the DC motor M is rotating through the chainset 23 and gearbox G. With the DC motor rotation, electric power is supplied to the DC motor M to transfer an auxiliary rotational power of the DC motor M to the chainset 23 and to the rear wheel 26 through a chain 25. A freewheel 27, chain 25, chainset 23, pedal 24 and other constructions of this bicycle are identical to those of a conventional bicycle. The switch 7 as shown in FIG. 1 is mounted on the frame 21 to detect a dip of the chain 25. Then, as the driver stops the pedalling action on the pedal 24, the upper side components of the chain 25 are slung down to shut off the power supply of the DC motor M.

However, in the control circuit described above, since the ON/OFF operation of the DC motor 1 is based on the pedalling action on the pedal 24, the power supply to the DC motor 1 performs with wasted energy consumption when the pedal 24 continues to be pedalled on a flat or downhill run.

When the auxiliary power is actuated on a downhill road, extreme acceleration of the bicycle may be provided to produce an uncontrollable speed. It is therefore preferable to activate the auxiliary power on a steep ascent of the road.

SUMMARY OF THE INVENTION

Accordingly, it is a primary object of the present invention to provide an auxiliary motor having a rotating shaft engaged with a front or rear wheel in combination with a dip sensor or switch for detecting a dip of a chain. Then, manual power is transferred through the chain to the wheel.

It is another object of the present invention to provide a gradient switch mounted on the frame for use in detecting a predetermined downhill angle of the bicycle relative to a horizontal plane.

It is a further object of the present invention to provide another gradient switch for detecting a predetermined ascent angle of the bicycle to produce a full auxiliary power.

It is a further object of the present invention to provide an analog gradient sensor for detecting an ascent angle of the bicycle relative to a horizontal plane to produce an auxiliary power in accordance with the ascent angle thereof.

It is still a further object of the present invention to provide a DC motor control or PWM circuit for a DC motor proportionally controlled by a gradient sensor.

BRIEF DESCRIPTION OF THE DRAWINGS

A better understanding of the present invention can be obtained when the following detailed description of the preferred embodiments are considered in conjunction with the following drawings, in which.

DESCRIPTION OF THE PREFERRED EMBODIMENTS

Figure 2:
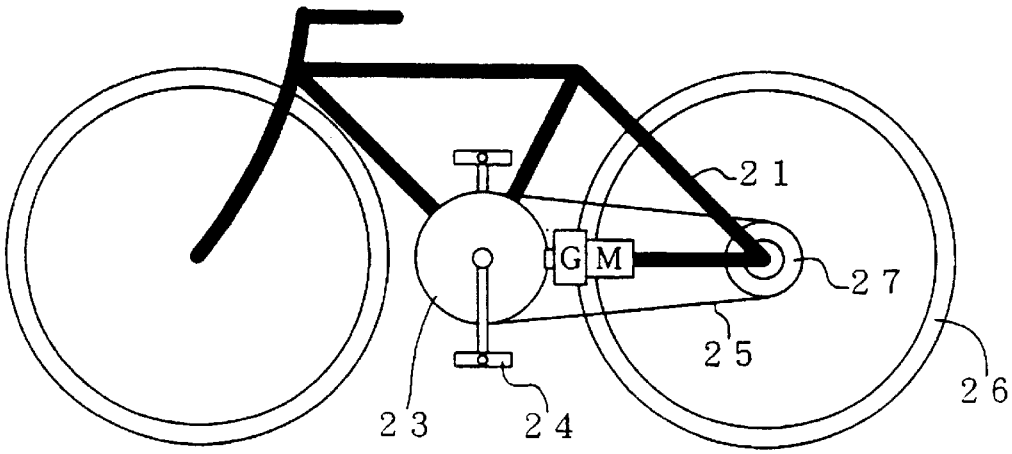
FIG. 2 PRIOR ART
FIG. 2 shows a schematic diagram of a conventional electric powered bicycle.
Figure 3:
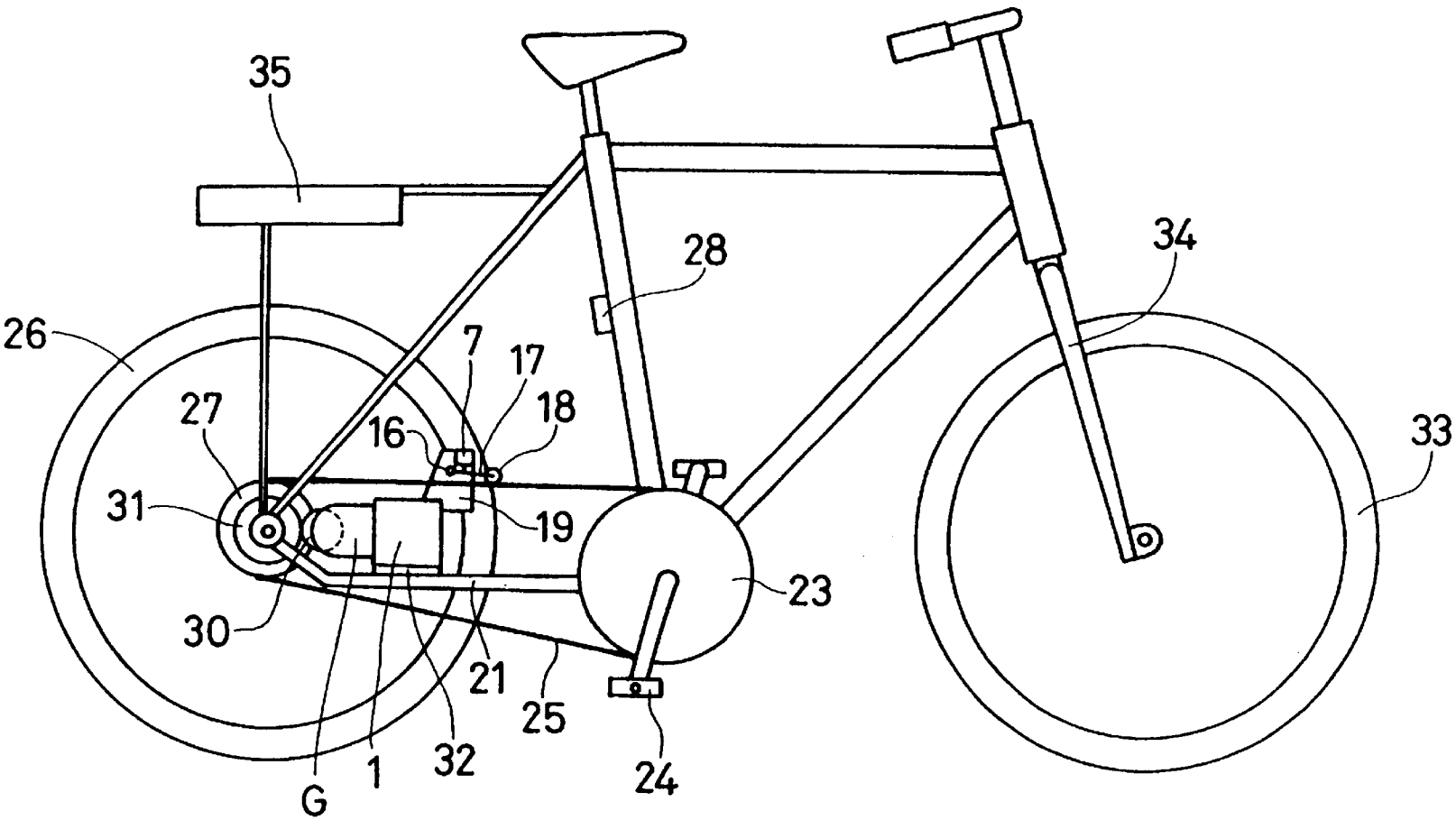
FIG. 3 shows a schematic side view of an electric powered bicycle according to a first embodiment of the present invention.
Figure 5:
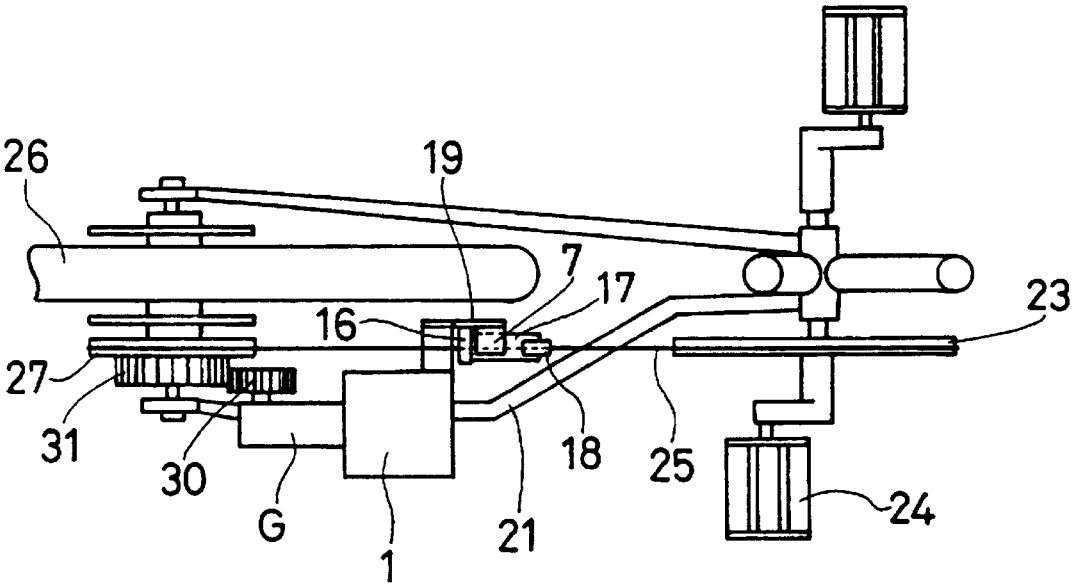
FIG. 5 shows a schematic partial top view of an electric powered bicycle of FIG. 3.

Referring now to FIGS. 3 and 5, an electric powered bicycle according to a first embodiment of the invention is generally shown. In FIGS. 3 and 5, the same reference numerals are used to denote the same components or parts as those in the prior art as shown in FIG. 2.

In FIG. 3, the bicycle is manually driven by pedal 24, a crank, chainset 23, chain 25 and rear sprocket 27 provided on a rear wheel 26 that are similar to those of the conventional bicycle. A motor 1 providing an auxiliary power source is mounted on a bracket 32 on the frame 21 in combination with a gearbox G. The horse power of motor 1 is transferred to the rear wheel 26 from the gearbox G through an output gear 30 and another gear 31 mounted coaxially with the rear sprocket 27. The power supply or battery (not shown) for the motor 1 is also installed in a luggage carrier 35 or other space within portions of the frame.

A switch 7 for turning the motor 1 on or off is electrically connected between the power supply and the motor 1. Switch 7 has an arm 17 pivotally supported on axis 16 and a roller 18 is provided on a free end of the arm 17. The roller 18 so abuts an upper side of the endless chain 25 that the arm 17 is pivoted in response to a dip of the chain 25 to detect the dip of the chain 25. A plate 19 mounted on the switch 7 and arm 17 are aligned and secured to a case of the motor 1 or bracket 32 so that the roller 18 is engaged with the chain 25 at a middle position between front and rear sprocket 23 and 27 to obtain a maximum dip change of the chain 25 relative to the manual pedalling force through the pedal 24. When the arm 17 is urged by a coil spring (not shown) downwardly, a chain tensioner can be provided in combination with the arm 17 and the roller 18 to suppress unfavorable vibrations of the dipped chain 25 and to prevent the dipped chain 25 from dropping out of the sprockets.

Figure 4:
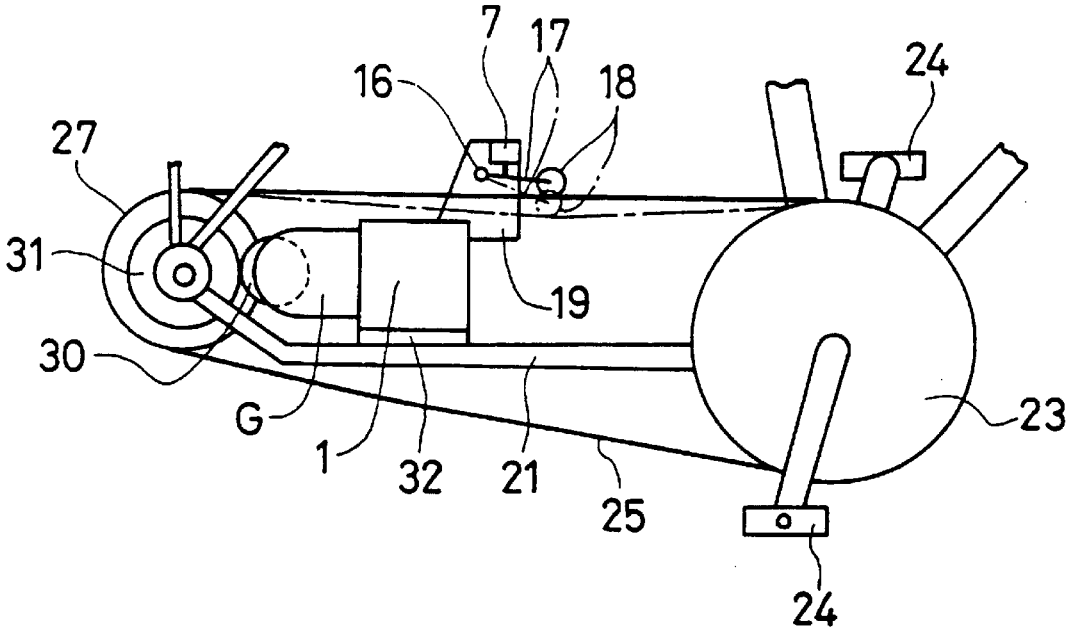
FIG. 4 shows a schematic partial side view of a drive mechanism of FIG. 3.

FIG. 4 shows an enlarged side view of the mechanism of the electric powered bicycle of FIG. 3. The chain 25 dips as shown in the chain line when the driver does not pedal the pedal 24 or when the bicycle is stopped or not moving. When the dipped chain 25 causes the roller 18 and arm 17 to move vertically downward as shown, the switch 7 goes to an OFF state and the power supply to the motor 1 is shut off.

When the driver pedals on the pedal 24 or when manual force is applied by the driver, tension on the chain 25 goes high and the chain 25 is tightened as shown by a solid line. When the tightened chain 25 causes the roller 18 and arm 17 to move upwardly as shown on the solid line, the switch 7 does to an ON state and the power supply to the motor 1 is resumed. Therefore, only when the driver pedals the pedals 24 is the driving force of the motor 1 applied as an auxiliary power source. When the driver steps off of the pedal 24 or the chain 25 is out of the sprockets, the roller 18 and arm 17 move downwardly as shown in the vertical line, the switch 7 goes to an OFF state and the power supply to the motor 1 is shut off. Therefore, this electric powered bicycle is not self-running with the driving force of the motor 1, irrespective of the driver's intention.

FIG. 5 shows a top view of the driving mechanism as shown in FIG. 4. The rear sprocket 27 is mounted on a well-known freewheel hub, and the forward manual force is transferred from the chainset 23 to the rear wheel 26. The gear 31 is mounted coaxially with the rear sprocket 27 and may be mounted on the freewheel hub as well as the rear sprocket 27 or integral with the rear wheel 26. When the gear 31 is mounted or integral with the rear wheel 26, the driving force of the motor 1 is not transferred from the chainset 23 to the pedal 24. Then, an accident in which the driving force of the motor 1 forcedly rotates the pedal 24 is prevented and a safety feature is thereby provided. Also, the rear wheel 26 can be adjusted back and forth on the frame 21 to adjust the dip level of the chain 25. Then, too, the motor 1 and gearbox G are adjustable on the frame 21 to adjust the meshed engagement between the gears 30 and 31.

Figure 6:
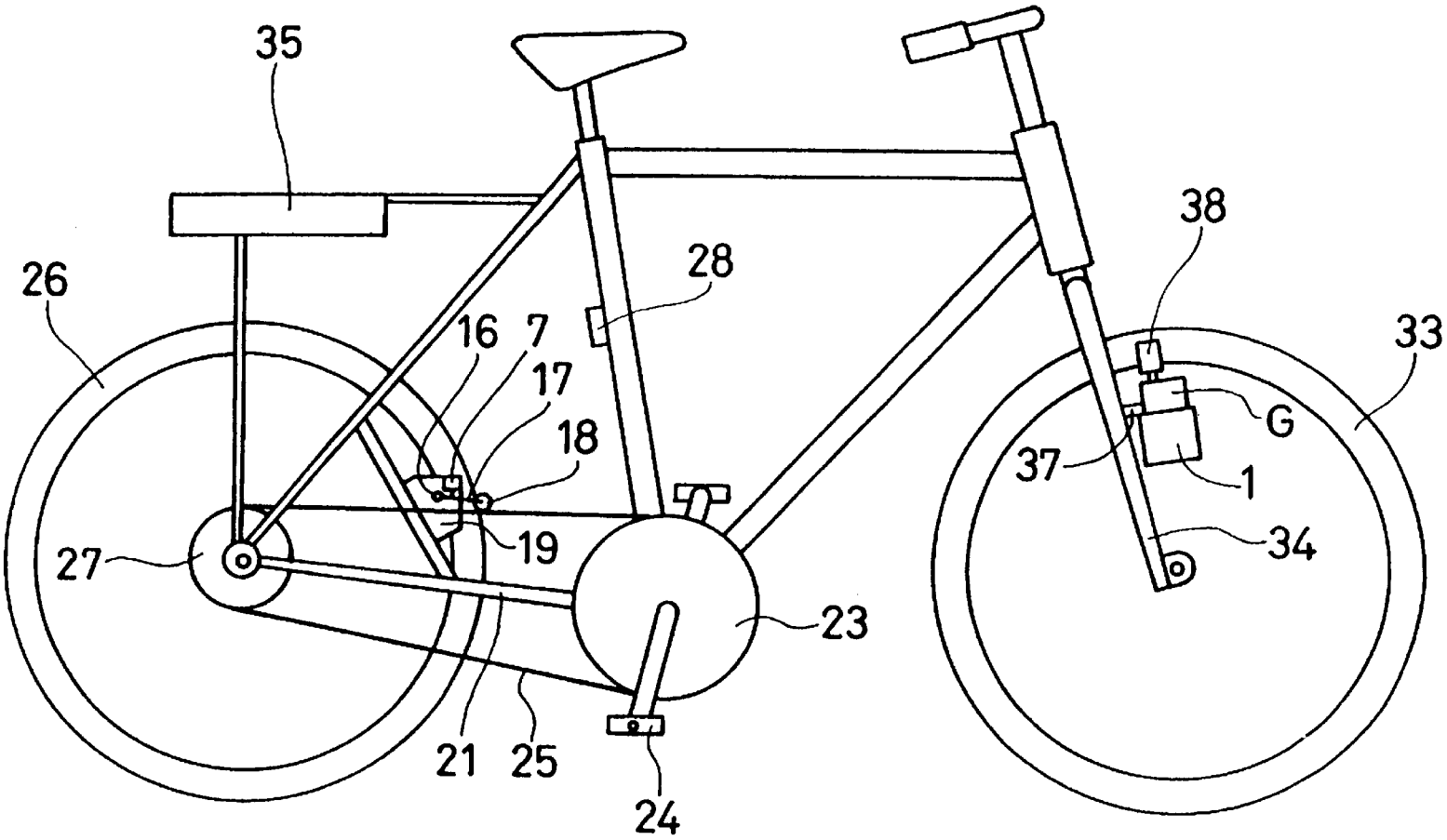
FIG. 6 shows a schematic side view of an electric powered bicycle according to a second embodiment of the present invention.

FIG. 6 shows a schematic side view of an electric powered bicycle according to a second embodiment of the present invention. The construction of this embodiment is identical to that of FIG. 3 except that the motor 1 and gearbox G are carried by a support shaft 37 provided on the front fork 34 to drive the tire of the front wheel 33 of the bicycle by an output roller 38 of the gearbox G. The output roller 38 is urged by a spring (not shown)to a side wall of the tire 33 and the switch 7 and arm 17 are similar to those of FIG. 3 except that the plate 19 is mounted on the frame 21.

Figure 7:
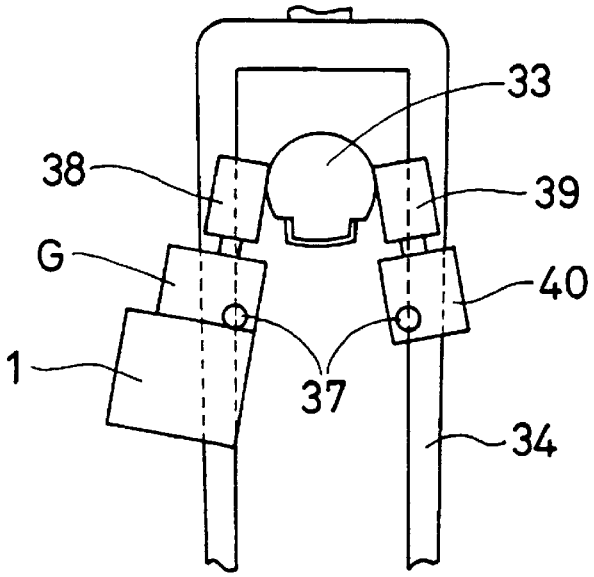
FIG. 7 shows a schematic partial front view of the electric powered bicycle of FIG. 6.

FIG. 7 shows a schematic partial front view of an electric powered bicycle of FIG. 6. In FIG. 7, the output roller 38 is urged by the spring (not shown) to one side of the tire 33 and another idle roller 39 opposite to the output roller 38 is provided to fairly transfer the drive force from the output roller 38 to the tire of the front wheel 33. This idle roller 39 is rotatably supported on a support member 40 carried by another support shaft 37 provided on the front fork 34 to be urged by another spring (not shown) as well as the output roller 38.

The tire drive mechanism of FIGS. 6 and 7 is also applicable to the rear wheel 26. A dynamo may also be installed in the support member 40 to turn on a head lamp with its generating output when night cycling.

In the embodiments described above, the power supply to the motor 1 is ON/OFF controlled by the switch 7. However, the switch 7 generally uses a micro switch or the like suitable for detecting the dip of the chain 25 which is not suitable for passing sufficient current for driving the motor 1. The driving current required would cause the abrasion of the contacts of the micro switch which would be damaged in a short period. Therefore, the addition of an electromagnetic relay or solid or semiconductor power element as a slave of the switch 7 would probably be necessary.

Figure 8:
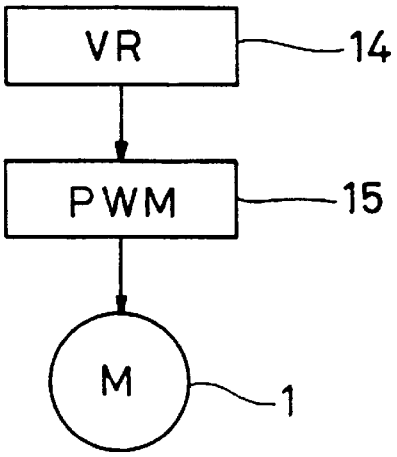
FIG. 8 shows a schematic block diagram of a DC motor control circuit suitable for use in the electric powered bicycles of FIGS. 3 and 6.

FIG. 8 shows a schematic block diagram of a DC motor control circuit suitable for use in the electric powered bicycles of FIGS. 3 and 6. In FIG. 8, a potentiometer or variable resistor (VR) 14 used as the gradient sensor is provided instead of the switch 7 to detect the dip degree of the chain 25. An analog signal of the variable resistor 14 proportional to the dip degree is applied to a PWM (Pulse Wide Modulation) amplifier or buffer 15 to drive the motor 1 with high efficient power consumption. Therefore, the driving force proportional to the pedalling rate of pedal 24 by the younger or older driver is performed as well as the smooth or mature steering operations of the bicycle.

Figure 1:
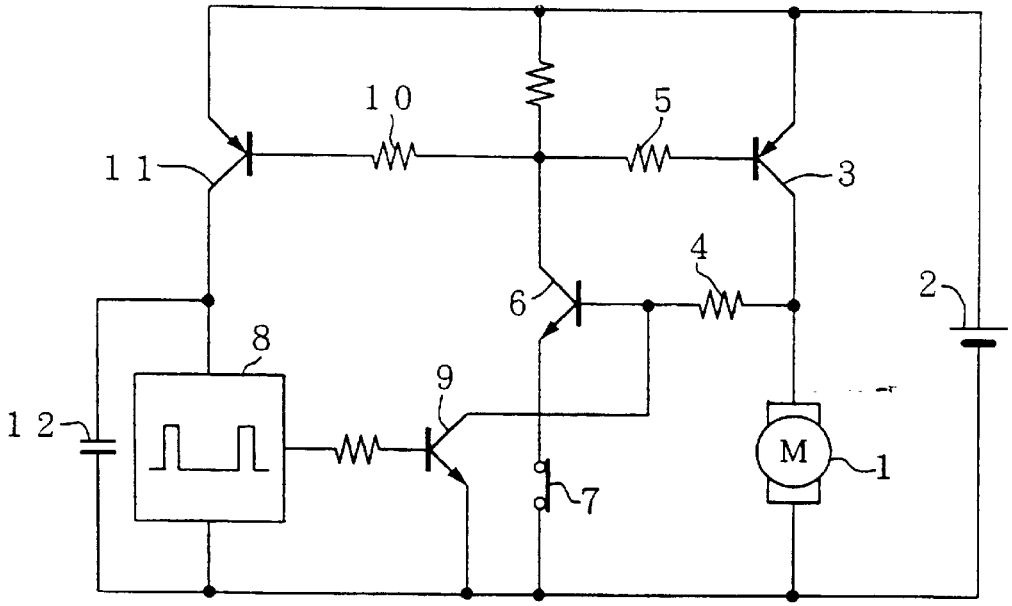
FIG. 1 PRIOR ART
FIG. 1 shows a schematic circuit diagram of a conventional DC motor control circuit of an electric powered bicycle.

For example, the DC motor control circuit as shown in FIG. 1 may be used to periodically monitor an induced voltage generated upon the rotation of the DC motor 1, and then continue to supply power thereto when the induced voltage exceeds a predetermined threshold level. In the case when an external force causes the DC motor 1 to stop, the supply power to the DC motor 1 is shut off during the next induced voltage monitoring period to prevent the DC motor 1 from burning or being harmed.

As the DC motor 1 and the dip switch are detachable with the bracket, ordinary bicycles can be easily modified to electric powered bicycles. Additional switches synchronous with a break switch may be mounted on the bicycle to prevent the DC motor 1 from rotating when a break operation takes place.

As described above, according to the present invention, a dip change of the chain is detected when manual power is transferred. Accordingly, an electric powered bicycle is operated without wasted energy consumption.

As the DC motor 1 drives the rear or front wheel by another route compared to the chain for transferring manual power, the drive force of the DC motor does not affect the driver. Since the drive of the DC motor is stopped by the dipping of the chain when the drive force of the DC motor proceeds to manual drive, an electric powered bicycle is easily provided with extreme safety.

The dip switch comprises an arm pivoted in response to the dip of the chain. Then, the arm not only detects the dip of the chain but also performs the function of suppressing vibrations of the chain or removal of the chain from the sprocket.

By using a PWM circuit in conjunction with the analog dip sensor, a smooth or linear auxiliary control of the DC motor can be obtained.

Figure 9:
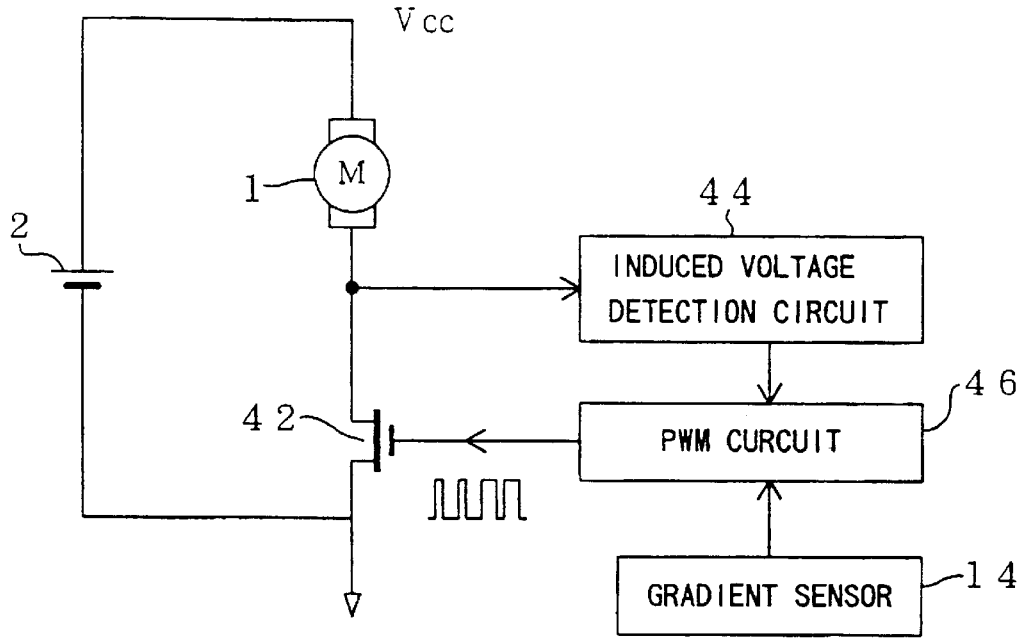
FIG. 9 shows another schematic block diagram of a DC motor control circuit for the electric powered bicycles of FIGS. 3 and 6 each having a gradient sensor.

FIG. 9 shows another block diagram of a DC motor control circuit for the electric powered bicycles of FIGS. 3 and 6 each having an analog gradient sensor 14. The gradient sensor 14 is mounted on the frame 21 as shown in FIGS. 3 and 6 to provide an analog signal proportional to an ascent angle of the road and to output a maximum analog signal, for example, at 6 degrees of the ascent angle. The gradient sensor 14 comprises a Hall element or variable resistor associated with a magnetic pendulum or weight to output an analog signal depending on the ascent slope.

The control circuit similar to that of FIG, 8 comprises a battery 2, a power MOSFET 42 source coupled to ground and a negative terminal of the battery 2, and a DC motor 1 connected between a positive terminal of the battery 2 and a drain of the MOSFET 42. The control circuit also comprises an induced voltage detection circuit 44 connected to a junction between the motor 1 and MOSFET 42 to periodically detect an induced voltage of the DC motor 1 and a PWM circuit 46 connected between an enable output of the detection circuit 44 and a gate of the MOSFET 42. The PWM circuit 46 also receives the analog signal from the gradient sensor 14 through a low pass filter (not shown).

Figure 10:
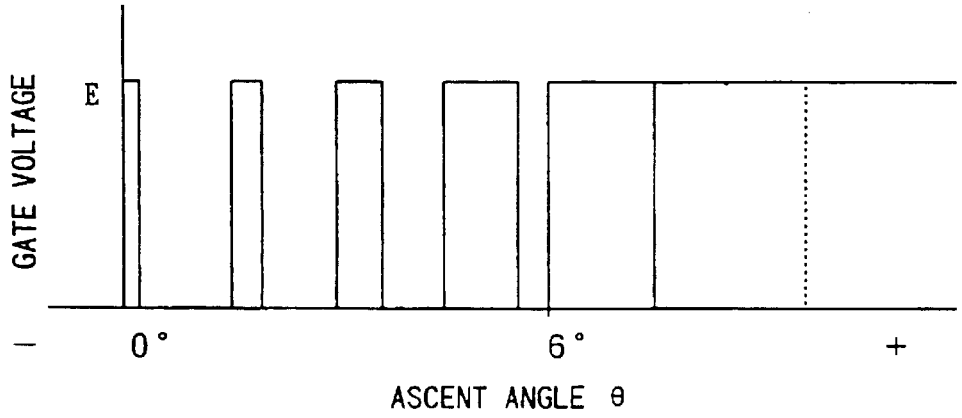
FIG. 10 shows a timing chart for the DC motor control circuit of FIG. 9.

FIG. 10 shows a timing chart of FIG. 9 that shows the waveform of the gate voltage of MOSFET 42 versus the ascent angle Θ. When the bicycle is running downhill or on a flat road, PWM power is not provided to the DC motor 1. When the bicycle begins on the road, at least one third full power may be supplied to the DC motor 1 associated with the dip sensor. On an ascent road having a predetermined range Θ, the pulse wide modulation power is supplied to the DC motor 1 in response to the gradient sensor. When the ascent road angle Θ exceeds, for example, six degrees, the PWM circuit continues in an ON state to supply full power to the DC motor 1 as an axillary full power source.

Figure 11:
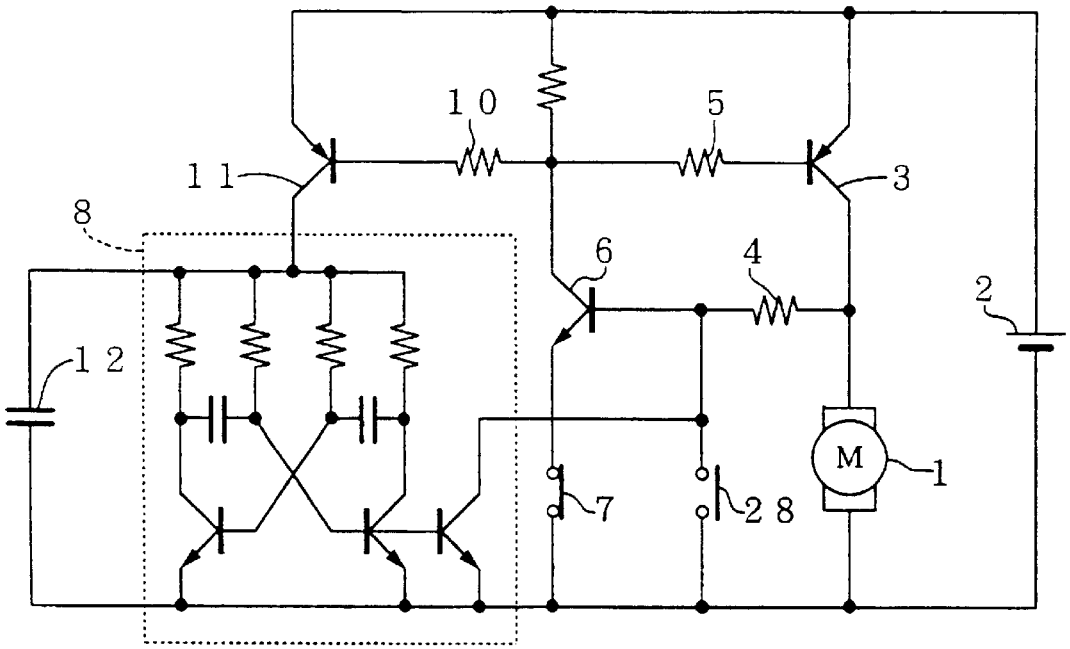
FIG. 11 is a DC motor control circuit for an electric powered bicycle showing a third embodiment of the invention.

Referring now to FIG. 11, a DC motor control circuit suitable for use in an electric powered bicycle according to a third embodiment of the invention is generally shown. In FIG. 11, the same reference numerals are used to denote the same components or parts as those in the prior art circuit as shown in FIG. 1 and a detailed description is omitted. In this control circuit, a gradient switch 28 is connected between the base of the detection transistor 6 and ground. The gradient switch 28 is mounted on the frame 21 of the bicycle as shown in FIGS. 3 and 6 so that it turns on when the bicycle is running downhill on a road having, for example, a 5 degree downhill angle. Then, the detection transistor 6 is turned off to shut off the power supply to the DC motor The gradient switch 28 is described in detail hereafter.

The pulse generator circuit 8 consists of a bistable multivibrator flip flop equivalent to the combination of the pulse generator 8 and transistor 9 as shown in FIG. 1. The generator 8 comprises two pull-up, for example, 100 kΩ resistors connected to collectors of a transistor and a multi-collector transistor, and two sets of a capacitor and a resistor connected from a base of a transistor to a collector of another or opposed transistor and to a positive voltage, respectively. Values of these two sets of the capacitors and resistors are predetermined to have, for example, a 1% duty ratio of pulses.

Figure 12:
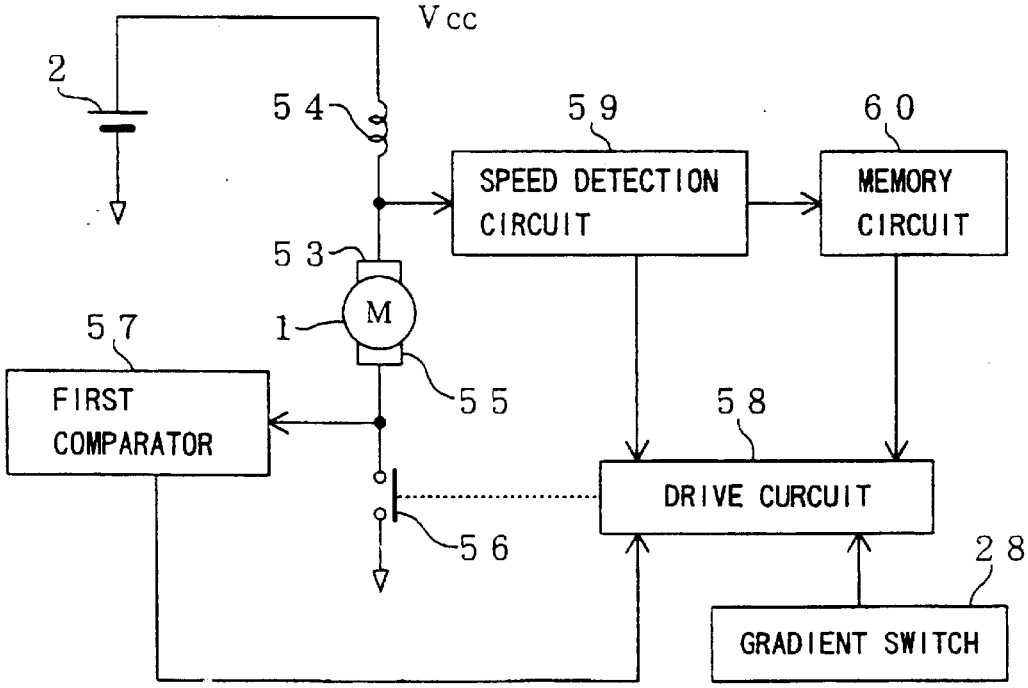
FIG. 12 is a schematic block diagram of a DC motor control circuit showing a fourth embodiment of the invention.

FIG. 12 is a block diagram of a DC motor control circuit showing a fourth embodiment of the invention. In FIG. 12, the same reference numerals are used to denote the same components or parts as those in the present circuit as shown in FIG. 11. First, a negative electrode of the power supply or secondary cell 2 is connected to ground. A coil 54 having a high impedance to pulses is connected between a positive electrode (Vcc) of the cell 2 and a brush 53 of the DC motor 1.

A relay contact 56 is connected between a second brush 55 and ground to rotate the DC motor 1 upon closing. An induced voltage is generated by the rotating DC motor 1 when the relay contact 56 is open. Then, short-period open windows are periodically provided, and the induced voltage is compared with a divided voltage of the power supply voltage Vcc at a comparator 57 whose output is applied to a drive circuit 58.

On the other hand, connected to a junction between the brush 53 and coil 54 is a running rate or speed detection circuit 59 to detect the rotational speed of the DC motor 1 when the relay contact 56 is closed.

The speed detection circuit 59 includes a time constant circuit that repeats charging per pulse generated upon switching polarity of commutators (not shown) of the DC motor 1. The speed detection circuit output is applied to the drive circuit 58 and to an analog memory circuit 60. The memory circuit 60 stores an analog signal or voltage indicating the rotational speed to a capacitor in response to the running speed of the vehicle, and the terminal voltage of the capacitor or memorized analog signal is input to the drive circuit 58. The drive circuit 58 compares the current analog voltage and the memorized analog voltage to produce a comparison result. Then, the relay contact 56 is controlled based on the comparison result or a gradient signal from the gradient switch 28.

According to the present invention, the DC motor 1 is rotatably mounted on the rear wheel 26. Then, when the driver pedals the pedal 24, a manual force rotates the rear wheel 26 through the chain 25 as well as the output shaft of the DC motor 1 in which case, the upper side or portion of the chain 25 that moves on the chainset 23 from the freewheel 27 is tensioned or tightened to turn on the switch 7. The DC motor 1 generates an induced voltage without supplying power. The first comparator 57 compares the induced voltage with a reference voltage to provide an output to be applied to the drive circuit 58. When a subtracted value of the induced voltage from the power supply voltage is lower than the reference voltage value, the output is supplied to the drive circuit 58 to latch the relay contact 56 to an ON state.

The bicycle running on a flat or ascent road continues to receive power from the DC motor 1 and to transfer the auxiliary power from the DC motor 1 to the rear wheel 26 of the bicycle. When the pedal is further pedalled to accelerate the bicycle, an analog voltage output of the speed detection circuit 59 is decreased to decrease an analog memory voltage of the memory circuit 60. When the bicycle is deaccelerated by a predetermined amount, the analog voltage becomes higher than the analog memory voltage and the output of the comparator of the drive circuit 58 transfers to a high (H) from a low (L) level. During a predetermined period after this level change, the drive circuit 58 turns off the relay contact 56 to provide a rotational detection period for the DC motor 1.

Figure 13:
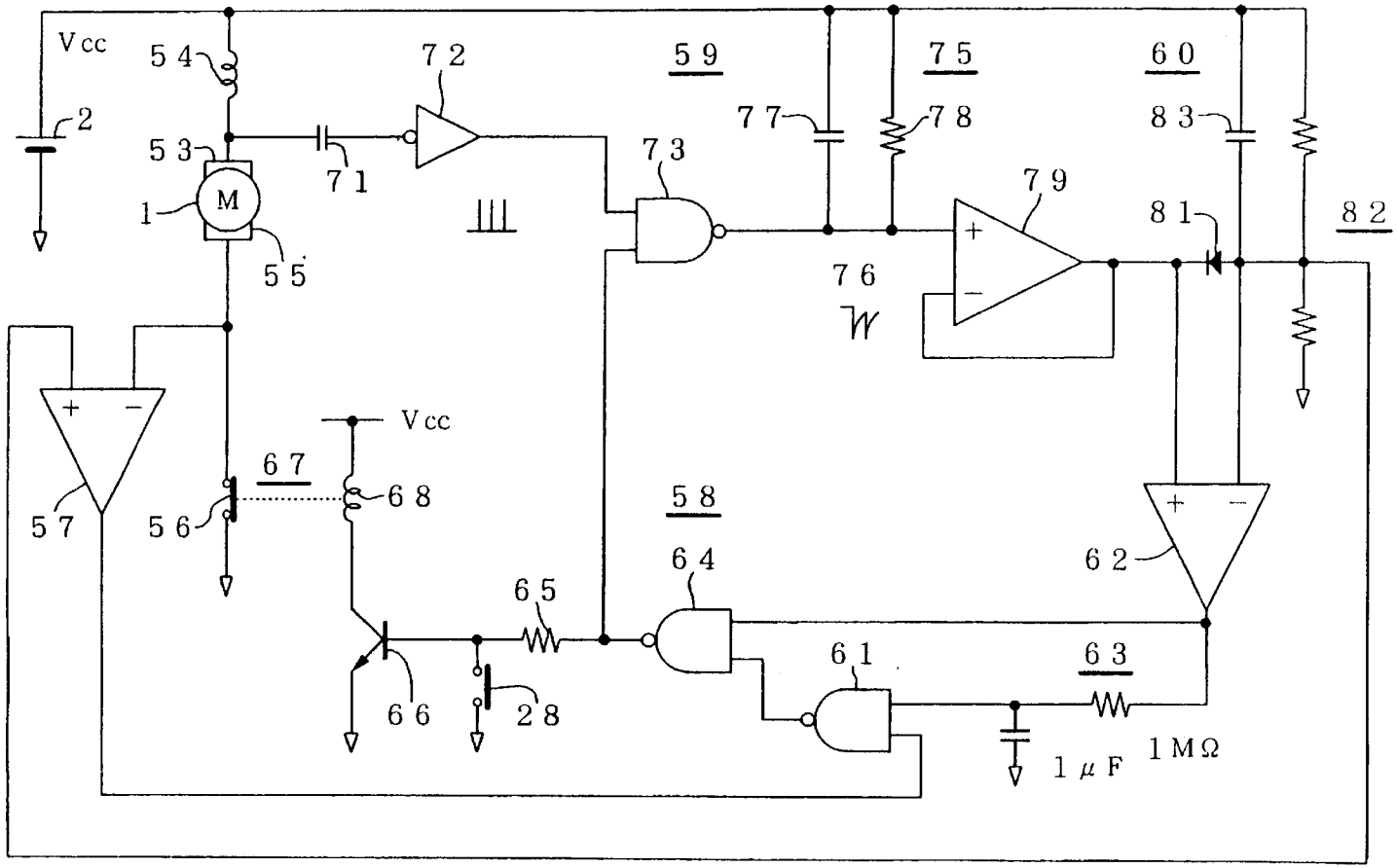
FIG. 13 is a circuit diagram of a DC motor control circuit according to the invention suitable for use in vehicles.

FIG. 13 is a circuit diagram of a DC motor control circuit according to the invention suitable for use in vehicles. In FIG. 13, the same reference numerals are used to denote the same components or parts as those in the present circuit as shown in FIG. 12. A brush 53 of the DC motor 1 is connected to a positive voltage (Vcc) of, for example, a 12 volt cell 2 through a coil 54. A second brush 55 of the DC motor 1 is connected to an inverting input of a first comparator 57 that detects an induced voltage.

A non-inverting input of the comparator 57 is connected to a divider circuit 82 of a memory circuit 60 or reference voltage source and its output is connected to a first NAND gate 61 of the drive circuit 58. Drive circuit 58 comprises a second comparator 62, a delay circuit 63 for delaying an output of the second comparator 62 applied to the first NAND gate 61 and a second NAND gate 64 that receives an output of the second comparator 62.

The delay circuit 63 includes, for example, a 1 MΩ resistor connected between the output of the comparator 62 and an input of the NAND gate 61, and 1 micro farad capacitor connected between the input of the NAND gate 61 and ground. The delay circuit 63 may be substituted with a delay element or D-type flip flop having a clock input. An output of the first NAND gate 61 is connected to the second NAND gate 64. An output of the second NAND gate 64 is connected through a resistor 65 to a base of a transistor 66 whose collector is connected to the positive power source line Vcc through a coil 68 of an electromagnetic relay 67. The base of the transistor 66 is connected to ground through a gradient switch 28 that turns on at a predetermined downhill slope of the road.

Therefore, when the DC motor 1 is stopped, the relay contact 56 maintains an OFF state and the electric power from the cell 2 is not supplied to the DC motor 1. Outputs of the first comparator 57, the first NAND gate 61 and the second comparator 62 are L, H and H, respectively. When an external force causes the output shaft of the DC motor 1 to rotate through the chain 25, an induced voltage is generated between the brushes 53 and 55 of the DC motor 1. When a subtracted value of the induced voltage from the power supply voltage is lower than the reference voltage of the divider circuit 82, the outputs of the first comparator 57, the first NAND gate 61 and the second comparator 62 are at H, L and H levels, respectively, and the output of the second NAND gate 64 goes to a H level. The transistor 66 turns on, the coil 68 is energized to close the contact 56, and the DC motor 1 is supplied power to maintain its rotation.

On the other hand, the speed detection circuit 59 comprises an inverter 72 connected to the junction between the coil 54 and the first brush 53, and a third NAND gate 73 having inputs connected to outputs of the inverter 72 and the second NAND gate 64. The inverter 72 uses a Schmidt trigger type circuit that inverts negative components of the pulses which are converted to a logic level.

Also, the speed detection circuit 59 includes a time constant circuit 75 connected to an open collector or open drain output 76 of the third NAND gate 73. This time constant circuit 75 includes a capacitor 77 and a pull-up resistor 78 each connected between the output 76 and the positive power line. The output 76 is connected to a buffer or operational amplifier 79 having a gain of 1.

Accordingly, when the relay contact 56 is closed to rotate the DC motor 1, sequential sets of positive and negative pulses are generated as the rotating commutators intermittently contact the brushes. The sequential pulses indicating the rotation rate of the DC motor 1 are applied from the brush 53 to the third NAND gate 73 through a capacitor 71 and the inverter 72. On the other hand, because the H level of the NAND gate 64 is applied to the third NAND gate 73, the capacitor 77 is rapidly charged per pulse application due to the rotation of the DC motor 1, and then discharged with a predetermined time constant in combination with the resistor 78.

The voltage at the output 76 falls down to the saturated collector-emitter voltage or about 0.6 volt, and then traces a substantially saw-tooth waveform with a parabolic curve, with the maximum voltage of the saw-tooth waveform corresponding to the running speed of the vehicle. An output of the operational amplifier 79 is connected to its inverting input, a noninverting input of the second comparator 62, and a cathode of a diode 81. The memory circuit 60 includes a divider circuit 82 connected to an anode of the diode 81 and a capacitor 83 connected between the anode of the diode 81 and the positive power line.

The divider circuit 82 uses a high resistance potentiometer or variable resistor for dividing the power supply voltage. The anode of the diode 81 or analog memory voltage is connected to a noninverting input of the first comparator 57 and an inverting input of the second comparator 62. Capacitor 83 is used as an analog memory element, e.g., a polycarbonate film capacitor having a large capacity with less self-charging performance. The divider ratio is predetermined so that the output of the second comparator 62 goes to an H level upon stopping or parking of the bicycle.

Figure 14:
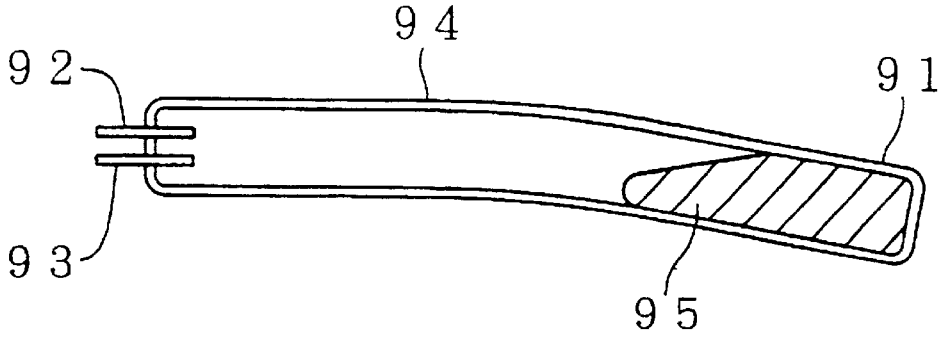
FIG. 14 shows a cross-sectional view of a gradient switch mounted on the electric powered bicycles of FIGS. 3 and 6.

FIG. 14 shows a cross-sectional view of a gradient switch 28 mounted on the electric powered bicycles of FIGS. 3 and 6. The gradient switch 28 comprises a mercury switch including an insulated tube or glass pipe 94. The glass pipe 94 is sealed with one end having two conductors or stems 92 and 93 and another end. The pipe 94 is curved to provide a mercury reservoir 91 for mercury 95. Therefore, the mercury switch 28 is adjustably mounted on the frame 21 of FIGS. 3 and 6 on, for example, a one degree angular scale so that the mercury 95 is positioned in the mercury reservoir 91 when the bicycle is running on a flat or ascent road, and the mercury 95 is moved to the conductor side when the bicycle is running on, for example, a 5 degree downhill road.

Figure 15:
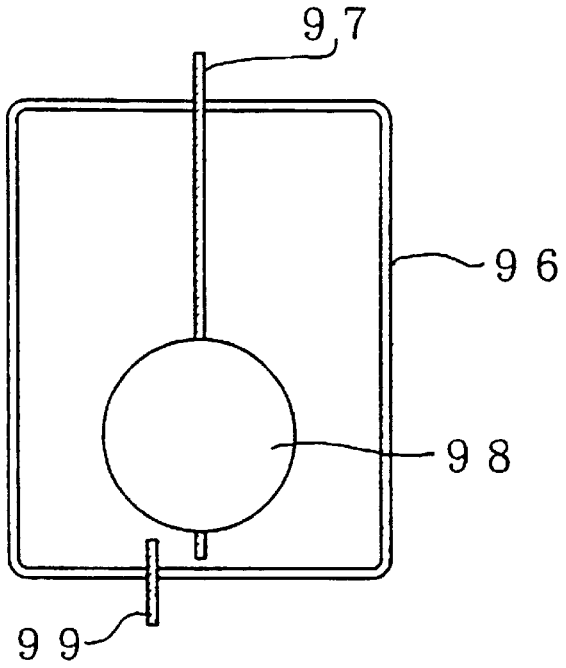
FIG. 15 shows a cross-sectional view of a gradient switch mounted on the electric powered bicycles of FIGS. 3 and 6.

A gravity switch may be used instead of the mercury switch. FIG. 15 shows a cross-sectional view of the gravity switch mounted on the electric powered bicycles of FIGS. 3 and 6. The gravity switch comprises a plastic housing 96, and a thin conductive plate spring or plastic plate spring 97 fixed to the housing 96 at an upper point adjacent to one end thereof. A weight 98 is fixed to the middle lower portion of the plate spring 97 to swing back and forth along the proceeding direction of the bicycle. Then, the lower end of the plate spring is projected from the weight to abut a contact 99 fixed to the housing 96 when the bicycle is running on, for example, a 5 degree downhill road.

An operation in which a control circuit for a DC motor is mounted on the electric powered bicycle is described hereinafter. First, when the driver pedals the pedal 24 to proceed to a predetermined running speed, the DC motor 1 is rotated to produce a corresponding induced voltage. If the value of the induced voltage subtracted from the power supply voltage is lower than a reference voltage, the DC motor 1 is supplied power to act as an auxiliary power source for the bicycle.

When the running speed of the bicycle increases, pulses from the first brush 53 are increased and the capacitor 77 is recharged, but not enough to be discharged. Then, the maximum voltage of the output 76 corresponding to the running speed is lowered. This maximum voltage is memorized by the capacitor 83 through the buffer 59 and diode 81.

Also, a charge stored in the capacitor 83 is gradually increased toward the reference voltage set by the divider circuit 82; however, the resistance of the divider circuit has a predetermined high value so that the increased charge is negligible. That is, a voltage subtracted by the voltage drop of the diode 81 from the maximum voltage corresponding to the current running speed of the motor is stored in the capacitor 83.

Then, when the bicycle is accelerated on a flat or ascent road, the maximum voltage is reduced to update the voltage of the capacitor 83 or memory. Even if the bicycle is running at the inertia or deaccelerated by the speed corresponding to the voltage drop of the diode 81, the output of the second comparator 62 maintains an L level and the DC motor 1 continues to act as an auxiliary power source for the bicycle.

When the bicycle is running downhill and a predetermined gradient of the downhill is reached, for example, 5 degrees, the gradient switch 28 turns on. Then, the transistor 66 turns on to shut off the power supply to the DC motor 1. Therefore, the auxiliary power of the DC motor 1 does not provide any load if the driver brakes the bicycle.

When the bicycle is deaccelerated more than the speed corresponding to the voltage drop of the diode 81, the output of the second comparator 62 goes high. When the output of the second comparator 62 goes to an H level, the output of the NAND gate 64 goes to an L level and returns to an H level after a predetermined period set by the delay circuit 63.

The delay period of the delay circuit 63 is set by, for example, 1 megaohm and 1 microfarad. When the output of the second NAND gate 64 goes to an L level, the contact 56 is opened and during the delay period, the first comparator 57 detects the generated induced voltage of the DC motor 1 if the motor is rotating.

The delay period is provided to monitor the running state of the deaccelerated bicycle. When the bicycle is running at a certain speed, the rotation of the DC motor 1 continues, and the H level is applied to the first NAND gate 61 from the first comparator 57 to again turn on the relay contact 56. Then, the DC motor 1 is again supplied power. However, when the running speed or rotation speed is reduced to near stoppage, the output of the first comparator 57 goes to an L level and the power supply to the DC motor 1 is shut off.

In the aforesaid embodiment, the capacitor and resistor of the delay circuit 63 is determined such that its time constant is longer than the response rate of the electromagnetic relay 67 to accurately turn off the relay 67 even if the electromagnetic relay 67 has a slower response rate. After turning off the electromagnetic relay 67, the output of the delay circuit goes to an H level. Then, even if the rotational speed of the motor is reduced, the restraint detection can be accurately performed. The speed detection circuit 59 may be replaced with a rotary encoder connected to the shaft of the DC motor 1 and a Frequency to Voltage (FV) converter for converting pulse signal from the rotary encoder to a voltage. The gradient switch 28 may be activated on a 5 degree ascent road in combination with the replaced circuit in which the switch is connected between the base of the transistor 66 as shown in FIG. 13 and the Vcc power source line through a serial resistor (not shown).

As described above, according to the DC motor control circuit of the present invention for an electric powered bicycle, an analog voltage corresponding to the running speed of the bicycle on a flat or an ascent road is updated upon accelerating. Upon deacceleration by more than a predetermined amount, power supplied to the DC motor is shut off to provide a detection window for an induced voltage. When the bicycle is running on, for example, a 5 degree downhill road, power supplied to the DC motor is shut off. The auxiliary power by the DC motor is obtained depending on the road conditions and the nature of the pedaling operation, which conserves the electric energy supplied to the DC motor. Because an analog voltage corresponding to the running speed is stored in a capacitor, circuit configurations are simple, thereby providing enhanced circuit reliability.

Also, there are many other advantages, e.g., reduction in fabrication cost by using a low-cost electromagnetic relay. When the mercury switch is used as the gradient switch, age deterioration is not a problem in detecting with high fidelity an angle of the bicycle frame and to provide a highly-reliable control circuit. When the gravity switch is used as the gradient switch, enhanced directivity of the gradient switch provides an error free control circuit.

The present invention can be applied to an electric powered bicycle having a changing gear ratio mechanism for a gear box that is used between the rear wheel and front sprocket through the chain. Then, a manual lever for changing the gear ratio through a wire can be made synchronous with another variable resistor, digital encoder or switches instead of a gradient sensor.

The foregoing disclosure and description of the invention are illustrative and explanatory thereof, and various changes in the size, shape, materials, components, circuit elements, wiring connections and contacts, as well as in the details of the illustrated circuitry and construction may be made without departing from the spirit of the invention.

I claim:

1. An electric powered bicycle comprising:

front and rear wheels rotatably supported by a frame of the bicycle;

a chain for transferring a manual power to one of said wheels via a pedal;

a DC motor for driving said rear wheel to provide an auxiliary power source;

a power supply capable of supplying voltage to said DC motor;

gradient means *for determining the angle of the bicycle relative to a horizontal plane* mounted on said frame and activated when said frame is inclined relative to a horizontal line; and a control circuit for controlling the voltage supplied to said DC motor from said power supply based on a signal from said gradient means, said control circuit comprising:

a power transistor for controlling the voltage supplied to said DC motor;

a detection transistor for detecting an induced voltage generated between brushes of said DC motor upon the rotation of said bicycle to turn on said power transistor; and a pulse generator for periodically turning off said detection transistor, said gradient sensor being activated to turn off said detection transistor when the gradient of said frame exceeds a predetermined level.

2. An electric powered bicycle according to claim 1, in which a switch for detecting a dip of said chain is provided on said frame, said control circuit being actuated by turning on said switch that detects the tension of said chain.

3. An electric powered bicycle according to claim 2, wherein said gradient means *for determining the angle of the bicycle* includes a gradient sensor for producing an analog gradient signal corresponding to an ascent angle of a road on which the bicycle is travelling and further comprising a PWM control circuit for controlling the voltage supplied to said motor from said power supply based on said analog signal from said gradient sensor.

*4. An electric powered bicycle, comprising:*

*front and rear wheels rotatably supported by a frame of the bicycle;*

*an electronic motorized tire drive mechanism for driving at least one of said wheels to provide a power source therefor;*

*a power supply capable of supplying voltage to said electric motorized tire drive mechanism;*

*gradient means mounted on said frame and activated when said frame is inclined relative to a horizontal line; and*

*a control circuit for controlling the voltage supplied to said motor from said power supply based on a signal from said gradient means, said control circuit comprising:*

*a power transistor for controlling the voltage supplied to said motor;*

*a detection transistor for detecting an induced voltage generated between brushes of said motor upon the rotation of said bicycle wheel to turn on said power transistor; and*

*a pulse generator for periodically turning off said detection transistor,*

*said gradient sensor being activated to turn off said detection transistor when the gradient of said frame exceeds a predetermined level.*

*5. An electric powered bicycle according to claim 4, further comprising:*

*a pair of pedals for engaging a user's feet; and*

*a manual tire drive mechanism for transferring manual power from said pedals to at least one of said wheels.*

*6. An electric powered bicycle according to claim 5, in which said manual tire drive means comprises a chain;*

*and wherein said bicycle further comprises, attached to said frame, a switch for detecting a decrease in tension of said chain;*

*wherein said control circuit is activated by said switch.*

*7. An electric powered bicycle according to claim 5, wherein said manual tire drive means comprises a chain, and*

*said bicycle further comprising, attached to said frame, a switch for detecting a decrease in tension of said chain, wherein said control circuit is activated by said switch.*

*8. An electric powered bicycle according to claim 4,*

*wherein said gradient means includes a gradient sensor for producing a gradient signal corresponding to an ascent angle of a road on which said bicycle is traveling,*

*and further comprising a PWM control circuit for controlling, as a function of the gradient signal, the voltage being supplied to said motor from said power supply.*

*9. An electric powered bicycle according to claim 4, wherein said gradient means includes a gradient sensor for producing a gradient signal corresponding to an ascent angle of a road on which said bicycle is traveling, and*

*further comprising a PWM control circuit for controlling, as a function of the gradient signal, the voltage being supplied to said motor from said power supply.*

*10. In a bicycle having a frame, front and rear wheels rotatably mounted on said frame, pedals, and a manual tire drive mechanism for transferring mechanical power from the pedals to at least one of said wheels, the improvement comprising:*

*an electric motorized tire drive mechanism for driving said wheel driven by said manual tire drive mechanism to provide an auxiliary power source therefor;*

*a power supply capable of supplying voltage to said electric motorized tire drive mechanism;*

*gradient means for determining the angle of the bicycle mounted on said frame and activated when said frame is inclined relative to a horizontal line; and*

*a control circuit for controlling the voltage supplied to said motorized drive mechanism from said power supply based on a signal from said gradient means, said control circuit comprising:*

*a power transistor for controlling the voltage supplied to said motor;*

*a detection transistor for detecting an induced voltage generated between brushes of said motor upon the rotation of said bicycle wheel to turn on said power transistor; and*

*a pulse generator for periodically turning off said detection transistor,*

*said gradient sensor being activated to turn off said detection transistor when the gradient of said frame exceeds a predetermined level.*

* * * * *